INVENTOR.
HARVEY ROSENBERG
BY James J. Wood
ATTORNEY

INVENTOR.
HARVEY ROSENBERG
BY James J. Wood
ATTORNEY

April 12, 1966 H. ROSENBERG 3,246,168

SAMPLING CIRCUIT PROVIDING A STROBE PULSE STRADDLED BY A SWITCH PULSE

Filed Sept. 21, 1960

4 Sheets-Sheet 3

INVENTOR.
HARVEY ROSENBERG

BY James J. Wood
ATTORNEY

INVENTOR.
HARVEY ROSENBERG
BY James J. Wood
ATTORNEY

United States Patent Office 3,246,168
Patented Apr. 12, 1966

3,246,168
SAMPLING CIRCUIT PROVIDING A STROBE PULSE STRADDLED BY A SWITCH PULSE

Harvey Rosenberg, Drexel Hill, Pa., assignor to Burroughs Corporation, Detroit, Mich., a corporation of Michigan Filed Sept. 21, 1960, Ser. No. 57,428
14 Claims. (Cl. 307—88.5)

This invention relates to sampling circuitry, and more specifically to sampling circuitry for utilization in a graphic characted recognition system.

While the instant invention has utility wherever characters or symbols must be identified for intelligence purposes, nevertheless, the solution which it affords finds particular applicability in the high speed digital computer art. In many applications, a major obstacle arises in handling information at the input of the computer proper. The computing operations, arithmetic or otherwise, can usually be accomplished with substantial rapidity—the problem arises in feeding the input data with sufficient speed to keep the computer in active operation. Stated differently, the inherent advantages of fast machine operation are considerably nullified if many more hours must be spent handling and arranging the information to be fed to the computer.

A classic example of this type of data processing arises in the mechanization of banking problems. The use of checks in personal and business transactions has expanded enormously in the last decade, and there is every indication that the increase will continue in the years ahead. A rather small bank, for example, having from 15,000 to 50,000 checking accounts may be called upon to process from 20,000 to 75,000 checks daily.

After some preliminary studies, the Office Equipment Manufacturers Institute and the American Bankers Association recommended magnetic character recognition for use in banking practice, the standard characters comprising ten decimal digits and four coding symbols each designed to be sufficiently diffeernt for machine recognition, while still retaining sufficient detail of their orthodox counterparts to enable visual recognition. The characters are magnetized, and the resulting magnetic field is caused to create flux linkages in a read head, the signal obtained being a function of the time rate of change of the flux linkages.

Each of the ten digits and four coding symbols has its own nominal readback voltage waveform, and the problem then arises to identify these waveforms with the accuracy demanded by banking practice. Recognition is complicated by the fact that since the check or other item contains many characters, one waveform is usually followed closely by another. Stated differently, since the waveforms are continuously varying with time, it is necessary to examine the waveform at the proper time to eliminate a spurious recognition. Further, there are departures from the nominal waveform because of such disturbances as malformation of the magnetic characters, or distortions in the formation of the magnetic characters because of rough handling of the item, and the like.

The technique for actually comparing a given readback voltage waveform with a stored representation for purposes of identification, is described in the copending patent application of Sheaffer, Jr. and Seif, entitled "Voltage Comparison Circuit," Serial No. 789,983, filed January 29, 1959, now Pat. No. 3,103,646, and assigned to the assignee of the present invention.

The technique for determining the optimum time $t_0$ at which comparison should be made between the readback voltage signal from a magnetic character to be identified, and the correct one of a plurality of stored representations of all possible characters is described in the copending patent application of Chow and Rosenberg entitled "Graphic Character Recognition," Serial No. 850,443, filed November 2, 1959, now Pat. No. 3,096,506. Briefly, a peaked voltage waveform signal is developed which is a function of the application of the readback voltage to all the stored representations. The peaked voltage waveform has a maximum peak at $t_0$. A sample interval signal is developed to timewise straddle the maximum peak. A fine timing signal is developed within the sample interval at the occurrence of each ascending peak up to and including $t_0$ always ignoring peaks which are smaller than the largest previous peak.

Each digit and coding symbol is provided with a discrete channel which includes a buffer amplifier. A cross correlation technique is utilized and the circuitry is arranged so that when a given font is to be identified, the output of its respective buffer amplifier will be of positive polarity, while all others will be of negative polarity. (Statistically there is a remote possibility that two buffer amplifiers will have positive outputs at the same time, but this contingency is provided for by other means as will be explained later.)

The output of the buffer amplifier may be only slightly positive with reference to ground, and there are myriad possibilities for the detection of positive peaks which would lead to spurious recognition.

In accordance with the invention, there is provided a sampling circuit comprising multivibrator means adapted to receive an input triggering signal and to deliver an output signal and the original complement signal thereof. A first driver means is adapted to receive said complement output signal and to deliver a sample switch pulse signal. Delay means are provided for receiving said output signal and for delivering a delayed output signal. A second driver means is arranged and adapted to receive the delayed output signal and for delivering a strobe output signal having a time width wholly contained within the time width of the same sample switch pulse signal.

One object of the instant invention is to provide an improved sampling circuit which will insure reliable detection of a signal of one polarity from among a plurality of signals.

Another object of the instant invention is to provide an improved sampling circuit wihch will respond to input triggering signals having a wide time width tolerance.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

In order to place the instant invention in proper perspective, it will be helpful to briefly review the principles upon which magnetic character recognition is bottomed. The basic problem of character recognition is to transform information from a series of printed characters and/or symbols into the binary form required by the computer logic. In the illustrative embodiment which will presently be described, the characters and symbols to be identified are printed in magnetizable ink. The item carrying this ink is then passed through a strong magnetic field to guarantee uniform magnetization, whereupon it is then passed under a read head. The magnetized ink causes flux linkages in the read head, the electrical signal from the head being proportional to the time rate of change in the flux linkages in accordance with the well known relationship:

$$e=\frac{-d\psi}{dt}$$

where $e$=the induced voltage and $d\psi/dt$=the change in weber turns per unit of time.

The resulting waveform must then be identified.

Figure 3:
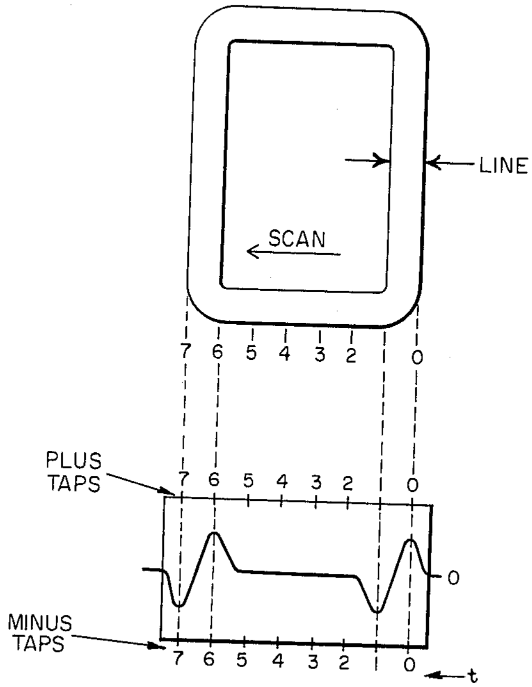
FIG. 3 is a view of the printed character "ZERO" in accordance with the common language adapted by OEM—ABA, together with the identifying voltage vs. time waveform.

In one particular application of character recognition—the mechanization of banking problems—the Office Equipment Manufacturers Institute and the American Bankers Association agreed upon a standard of character font consisting of ten decimal digits (0—9) and four coding symbols; they are designed to be sufficiently different for machine recognition, while still retaining such resemblance with standard formations as to be visibly recognizable. The waveform for the OEM–ABA standard "ZERO" is shown in FIG. 3.

There are three features of a readback voltage waveform which are used to identify a character: the position of the peaks in the character waveform, the polarity of the signal at various positions within the character, and finally the relative amplitudes of the peaks at these positions.

Figure 1:
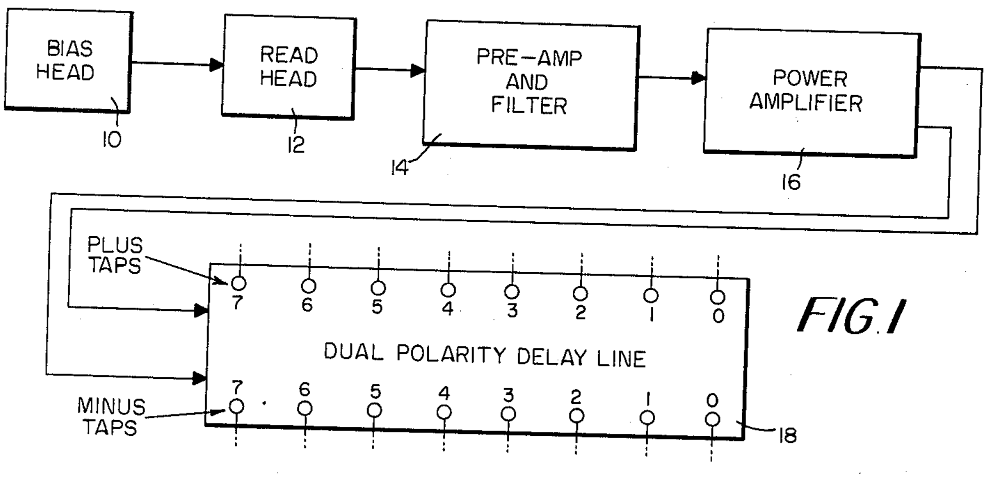
FIG. 1 is a block diagram depicting the development of the signal to be recognized and its appliaction to a delay line.

Referring now to FIG. 1 of the drawing, an item (such as a check) bearing suitable characters or symbols in magnetizable ink is transported past a bias head 10 and a read head 12. The magnetizable ink on the item is generally magnetically neutral when first printed. However, the printing may later come into contact with a magnetic field which may magnetize the ink in some random orientation. Since it is necessary to remove this spurious magnetization, the bias head 10 performs this function by overriding any previous magnetic history of the ink. By virtue of the relative polarities of the bias head and the read head, the first voltage peak of a character waveform in the time sense of FIG. 3 will always be positive, and the last peak negative. The low signal output of the read head is applied to a pre-amplifier and filter 14.

The basic character frequency is determined by the line width of the character (as defined in FIG. 3), and the velocity of the item past the read head 12. In the illustrative embodiment described herein, this frequency is 15.4 kilocycles. Since a single line width is the smallest dimension of interest, any frequency greater than 15.4 kilocycles is superfluous. Accordingly, in order to minimize noise such as that caused by discontinuities in the ink, the system signal path includes a pre-amplifier and filter 14 such that the system has a cut-off frequency of 16 kilocycles. The signal is next applied to a power amplifier 16 and then to a dual polarity delay line 18.

The purpose of the delay line 18 is to provide dynamic storage of the character waveforms, which provision, by means of appropriate taps, for measuring the waveform amplitude at specific intervals. The dual polarity line 18 comprises lumped constant (L-C) sections which configuration provides dual polarity; the concept of dual polarity has reference to the availability of either polarity voltage waveform at any given tap interval along the line.

Figure 2:
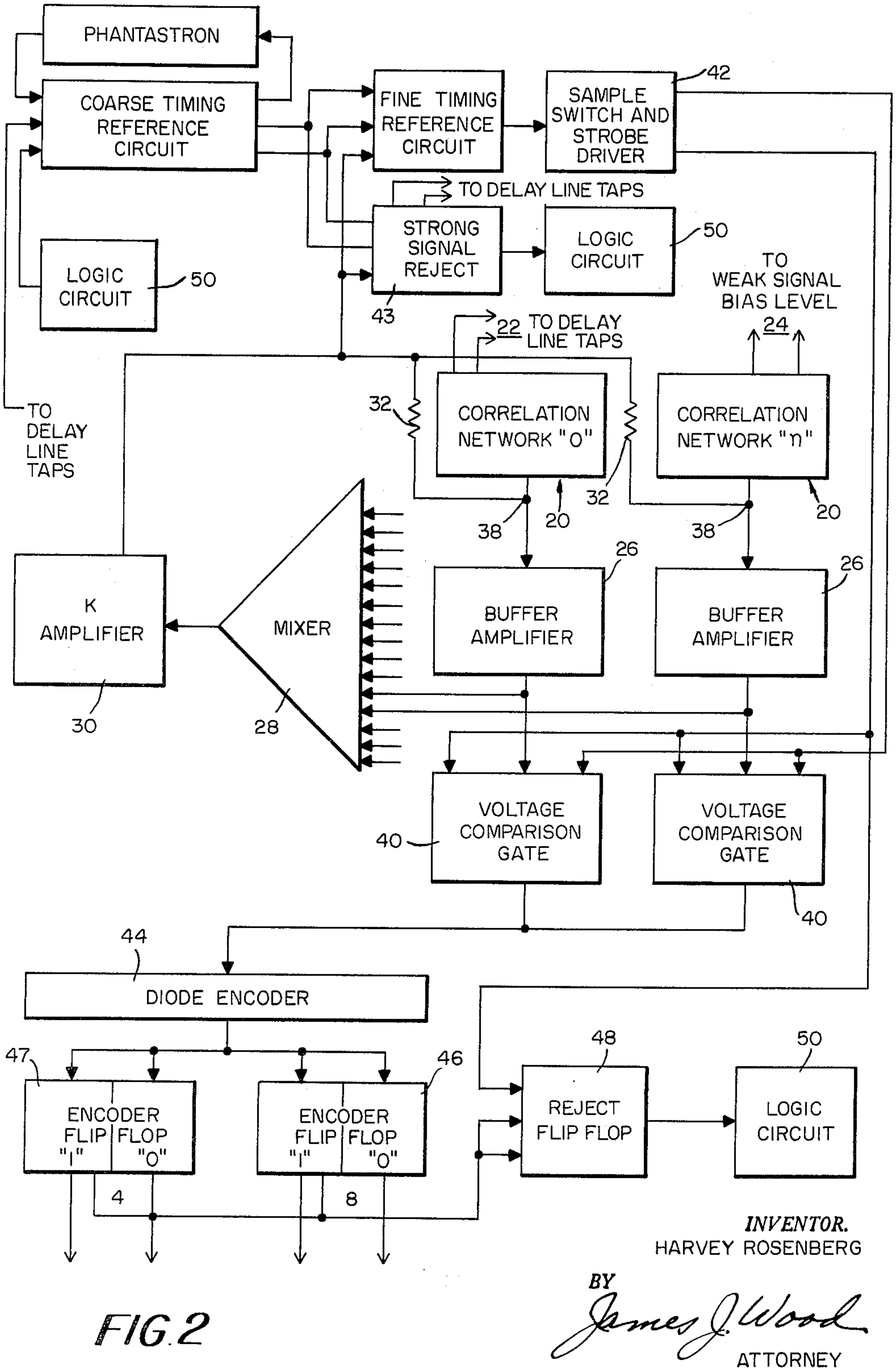
FIG. 2 is a block diagram supplementing FIG. 1, where FIGS. 1 and 2 considered together consitute the complete character recognition system.

Referring now to FIG. 2 of the drawings, correlation networks are indicated generally at 20, there being one network assigned to each character or symbol to be read, and in addition there is also one for rejection purposes as will be explained presently. A correlation network and its associated circuitry we shall define as a channel. In FIG. 2 only two channels are shown in the interest of simplicity: a "0" channel and a reject or weak signal channel indicated generally at 22, 24, respectively.

The correlation networks 20 are resistor networks for performing algebraic addition. These networks are described in greater detail in the copending application of Sheaffer, Jr., and Seif for "Voltage Comparison Circuit," Serial No. 789,983, filed January 29, 1959. Briefly the networks store the ideal waveform of the digit or symbol to which they have been assigned. The various components of the network are connected to the dual polarity delay line taps in predetermined fashion. If the conductance values (G) of the resistive components of network 20 are plotted as ordinates against the delay line taps as abscissa, by assigning a conductance to the abscissa value in accordance with the tap to which it is connected, it will be found that the plot is the nominal waveform signal, in sampled form, which is assigned to that network. For example, the correlation network of the "ZERO" channel 22 when so plotted would have the waveform shown in FIG. 3.

As the signal propagates along the delay line, various voltages are applied to the correlation networks 20, so that their respective outputs are changing in time. The problem is to determine the identity of the signal in the delay line. As described in the aforementioned copending application, this is accomplished by a waveform matching technique based on the auto-correlation and cross correlation functions of statistical mathematics, which give a maximum value for the condition of best match. The auto-correlation function is given by:

$$\phi_{11}(t)=\lim \frac{1}{2T}\int_{-T}^{T} f_1(\tau)\cdot f_1(\tau+t)\,d\tau$$

where $f_1(\tau)$ is any function of time and $f_1(\tau+t)$ is the same function shifted by a time $t$, where $t$ may be positive or negative.

It can be shown that the maximum value of $\phi_{11}$ occurs when $t=0$.

The cross correlation between $f_1(\tau)$ and $f_2(\tau)$ is given by $$\phi_{21}(t)=\phi_{12}(-t)=\lim_{T\to\infty} \frac{1}{2T}\int_{-T}^{T} f_2(\tau)\cdot f_1(\tau=t)\,d\tau$$

It can be shown that $\phi_{21}(t)$ can never be greater than $\phi_{11}(0)$ and at best can only be equal to $\phi_{11}(0)$. On a statistical basis, at most times the function $\phi_{21}(t)$ will be smaller than $\phi_{11}(0)$. Therefore when a signal is applied to its own correlation network, i.e., a "0" signal applied to a "0" correlation network, that output will be the greatest, and all others will be smaller, i.e., the output of a "0" signal applied to the 1, 2, 3, correlation networks, etc., will be smaller. The unlikely possibility of two correlation networks having outputs approaching the same magnitude is taken care of in a manner which will be explained.

The output of each correlation network 20 is applied to a buffer amplifier 26 having a gain very nearly equal to 1. The buffer amplifier is used for impedance matching, having an input impedance of 300K and an output approximately equal to 30 ohms. The output of each buffer amplifier is then fed to a diode mixer 28, the output of which is equal to the highest voltage received from any correlation network. The output from the diode mixer 28 is then applied to an inverting amplifier 30, from whence it is applied to the input of each buffer amplifier through a resistance 32.

Figure 4:
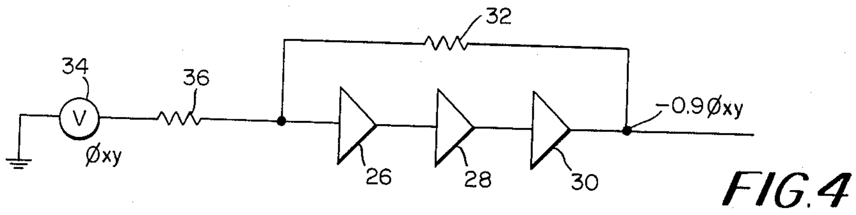
FIG. 4 is a block diagram showing how the buffer amplifier, mixer and inverting amplifier function as an operational amplifier.

As will be seen in FIG. 4, the buffer amplifier 26, diode mixer 28, inverting amplifier 30 and resistor 32 form a closed loop. The output of the inverting amplifier is —.9 of the highest equivalent voltage output of the correlation networks. The correlation networks 20 looking back from the input of amplifier 26 may be represented by a Thevenin equivalent circuit consisting of a generator 34 and a resistor 36. By design, the Thevenin equivalent resistance 36 will be equal for all correlation networks 20, and, in this particular embodiment, the resistance 32 is made equal to resistance 36. The generator voltage 34 will have a magnitude dependent upon the signal being applied to the associated correlation network.

Let the symbol $\phi$ represent the voltage output from any correlation network and two subscripts represnet respectively the character under detection and the network to which it is applied. Thus $\phi_{23}$ means the voltage caused by the application of the character 2 to the correlation network 3 (we shall consider only the digit characters at this point, omitting the symbols). When reading the characters, if the outputs of the correlation networks 20 are examined at a precise time, which will be explained presently, the Thevening generators will have voltages $\phi_{00}$, $\phi_{01}$, $\phi_{02}$—$\phi_{09}$. By design of the correlation networks as described in the copending application of Sheaffer, Jr., and Seif, supra, $\phi_{00}$, ($\phi_{01}$, $\phi_{02}$, $\phi_{03}$—$\phi_{09}$). The resistors 32, 36, are in a 1:1 relationship so that the voltage at node 38 is one-half of the voltage of the Thevenin generator minus one-half of the output of the inverting amplifier 30. Thus if a "0" is in the delay line the voltage at the point 38 for the "0" network will be $$\frac{1}{2}[\phi_{00}-0.9\phi_{00}]=+.05\phi_{00}$$

If $\phi_{01}$, $\phi_{02}$—$\phi_{09}$ are all less than $0.9\phi_{00}$, the corresponding point 38 on all the other correlation networks will be negative, and hence, one need only recognize which of these points is positive in order to identify the correct character. The factor 0.9 may of course be changed in magnitude; it is included here only by way of example.

In the process of identifying the voltage waveform in the delay line 18, the voltage comparison gates 40 are enabled by a signal from the sample switch and strobe driver 42. The sample switch and strobe driver 42 will be described presently in this application in greater detail. The single positive output from the correct buffer amplifier will pass through the appropraite gate 40 (FIG. 2) to a diode encoder 44 which will convert the waveform into binary form and apply it to the appropriate encoder flip-flop for temporary storage. In the illustrative embodiment, the identification is in the 8421 code. For simplicity only two encoder flip-flops 46 and 47 are shown representative of the places 8 and 4 respectively in the binary weighted code; it will of course be understood that in the actual embodiment two more encoder flip-flops are required for the 2 and 1 weighted places.

In the event that two buffer amplifier outputs are positive, i.e., one of the correlation networks has an output magnitude greater than or equal to 90% of the correct correlation network output, then one or more of the encoder flip-flops will have pulse on both inputs at the same time, which will cause a signal to be sent to the reject flip-flop 48, which in turn will send a signal to the logic circuit 50 to ignore the reading. In the case of a banking operation, this means that the check or other item will not be processed automatically, but will be rejected for hand posting. In effect this provides for the statistical possibility of the cross correlation function approaching within a specified percentage of the auto-correlation function.

The character recognition system will also reject an item when the signal is too weak, i.e. less than 50% of nominal printing, and when the signal is too strong, i.e. greater than 250% of nominal printing. There are other causes for rejecting an item but they are controlled from the logic circuitry which inspects all information for completeness and correct format.

The weak signal rejection is accomplished by the addition of a fifteenth channel, i.e. the weak signal channel FIG. 2:24. A weak signal D.C. bias level is applied which is equivalent to 90% of the weakest allowable signal. The correlation network 20 for the weak channel has an equivalent impedance which is the same as that of the other correlation networks. If the correct correlation network output falls below the weakest allowable value, an output will occur from both the "weak signal" and "correct signal" channels at sample time. An output from more than one channel is then interpreted by the reject flip-flop 48 and the logic circuit 50 as previously explained. If the signals are extremely weak such that the operational amplifier of FIG. 4 is only under the control of the weak signal bias, the item will be rejected because no output signals will be obtained from the fine timing reference circuit; the reason for this is that the fine timing reference circuit cannot operate with a D.C. level input—it responds only to waveform peaks.

When the signals become too strong the system becomes non-linear thus requiring additional means for rejection purposes. A strong signal reject circuit is indicated at FIG. 2:43, this circuit is described in greater detail in copending application of Rosenberg and Steckert for "Monitoring Circuit," Serial No. 11,344, filed on February 26, 1960, and assigned to the assignee of the present invention. Briefly, the circutry monitors the regions where strong signals may develop viz. at the output of the "K" amplifier FIG. 2:30 and the output of the power amplifier FIG. 1:16 by means of certain delay line taps.

Before describing the sample switch and strobe driver circutry of the instant invention, the overall description of the system will be completed. The digits and symbols on the items are read continuously, the resulting characteristic voltage wave form being applied to the delay line 18. The process is a continuous one. As the characteristic waveform traverses the delay line, the voltage at any one tap varies continuously with time. Obviously there is one point in time when the waveform in the delay line is in the optimum position. The system is designed so that under ideal conditions, when the first peak of any given waveform is at the "0" tap, its corresponding correlation network will have its maximum output. However, in practical situations, because of certain variables such as poor printing or mutilations, etc., the waveform may be distorted, so that the maximum output from the correlation network in question will occur when the first waveform peak is in the region of the "0" tap (possibly slightly before or slightly after the "0" tap). The copending application of Chow and Rosenberg for "Graphic Recognition Means," Serial No. 850,443, filed November 2, 1959, described a means for accurately determining the theoretical optimum time when the waveform should be sampled based on the correlation network outputs rather than when the first character peak arrives at a specific tap location.

The overall rationale of the timing technique consists of performing first a coarse timing function (developing a sample interval signal), and then a fine timing function within the sample interval. In effect, the coarse timing function states that a peak will occur within a given time interval (called the sample interval); in the practical embodiment herein described this is a time interval of 40$\mu$ seconds. A peaked voltage waveform signal is developed which is a function of the application of the readback voltage to all the stored representations; this peaked voltage waveform has a maximum peak at $t_0$. The sample interval signal timewise straddles the maximum peak. A fine timing signal is developed within the time span of the sample interval at the occurrence of each ascending peak up to and including $t_0$, always ignoring peaks which are smaller than the largest previous peak. Thus a number of fine timing signals are developed within the sample interval, the overall graphic character recognition system being arranged to ignore all the identification signals which the fine timing signal initiates, save that which occurs at $t_0$.

Figure 5:
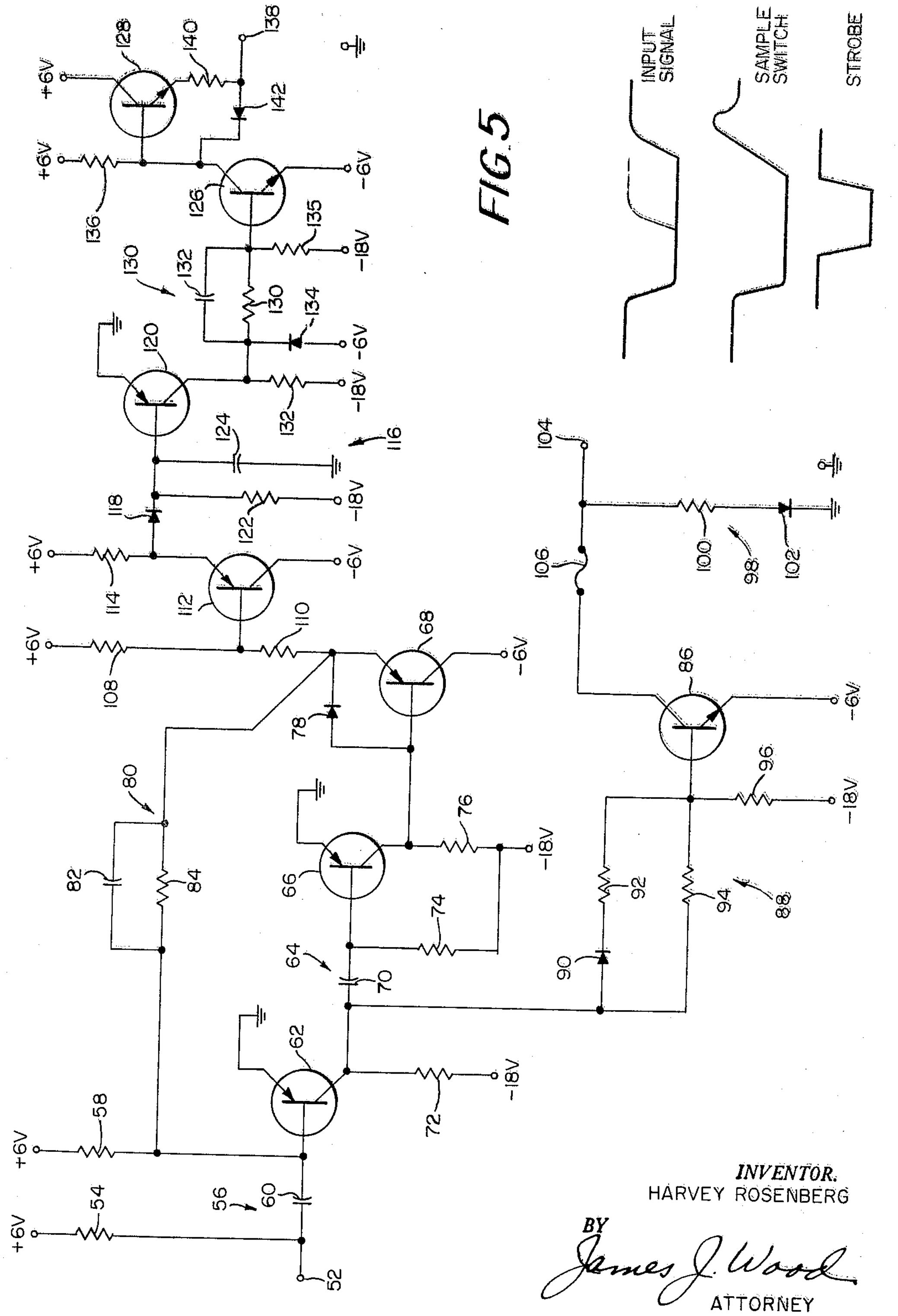
FIG. 5 is a diagram of the sampling circuit in accordance with the invention.
Figure 6:
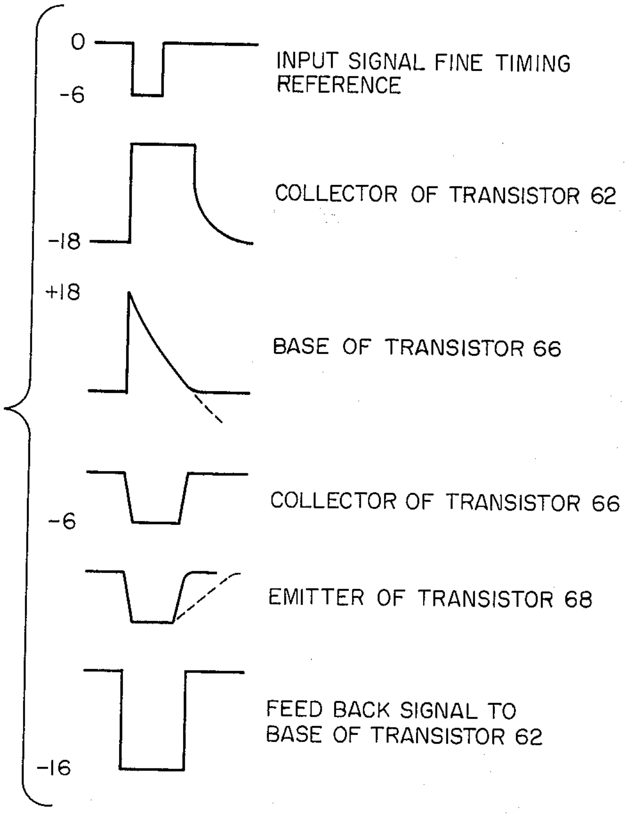
FIG. 6 is a series of waveforms used in explaining the operation of the circuit of FIG. 5.

The sample switch and strobe driver circuitry will be described by referring to FIGS. 5 and 6. The fine timing input signal to this driver circuit is applied between terminal 52 and ground. A source of positive potential (+6 v.) is connected to terminal 52 through a resistor 54. A differentiating circuit, indicated generally at 56, comprises a resistor 58 and a capacitor 60: one end of the resistor 58 is connected to the base of a transistor 62, while the other end is connected to a source of positive potential (+6 v.). The capacitor 60 is connected between input terminal 52 and the base of transistor 62.

A delay multivibrator, indicated generally at 64, comprises transistors 62, 66 and 68. The transistors 62 and 66 are arranged in the grounded emitter configuration. The collector of transistor 62 is connected to the base of transistor 66 through a capacitor 70, and to a source of negative potential (−18 v.) through a resistor 72. Bias potentials for the base and collector of transistor 66 are supplied through resistors 74 and 76 respectively. The transistor 68 is connected as an emitter follower, its base being connected to the collector of transistor 66. A diode 78 is arranged with its anode connected to the base of transistor 68 and its cathode connected to the emitter thereof. A regenerative loop indicated generally at 80 is connected between the base of transistor 62 and the emitter of transistor 68. The loop 80 comprises a capacitor 82 and a resistor 84.

The collector of transistor 62 is connected to the base of a driver transistor 86 through a parallel network, indicated generally at 88. This latter network comprises a diode 90 in series with a resistor 92, this series combination being in parallel with a resistor 94. Biasing potential for the base of transistor 86 is applied through resistor 96. The output of transistor 86 is developed across a series damping network, indicated generally at 98, and comprising a resistor 100 and a diode 102 connected between terminal 104 and ground, the cathode side of diode 102 being connected to ground. A protective fuse 106 is connected between the collector of transistor 86 and the terminal 104.

A voltage divider comprising resistors 108 and 110 is connected between a positive source of potential (+6 v.) and the emitter of transistor 68. The junction point of resistors 108 and 110 is connected to the base of an emitter follower buffer transistor 112. Biasing potential for the emitter of transistor 112 is applied through a resistor 114.

The buffer 112 is connected to a delay stage, indicated generally at 116, through a diode 118, the anode of which is connected to the emitter of transistor 112, and the cathode of which is connected to the base of a transistor 120. The delay stage comprises resistor 122 and capacitor 124, each having one end connected to the base of transistor 120, the other ends of these components being connected to a negative source of potential (−18 v.) and ground, respectively.

The transistor 120 together with the transistors 126 and 128 and associated components comprise a driver stage, indicated generally at 130. The collector of transistor 120 is connected to a source of bias potential (−18 v.) through resistor 132. A clamping diode 134 is also connected between the collector of transistor 120 and a source of negative potential (−6 v.), the cathode thereof being connected to the collector terminal of transistor 120. A parallel R-C circuit is connected between the collector of transistor 120 and the base of transistor 126; this latter circuit comprises resistor 130 in parallel with capacitor 132. Biasing potential (−18 v.) for the base of transistor 126 is applied through resistor 135. The transistor 126 is arranged in the common emitter configuration, the emitter thereof being connected to a source of negative potential (−6 v.). The collector of transistor 126 is connected to a source of positive potential (+15 v.) through a resistor 136; the resistor 136 also serves to convey biasing potential to the base of transistor 128 which is utilized in the common collector arrangement. The collector of transistor 128 is connected to a source of positive potential (+6 v.) while the emitter is connected to output terminal 138 through resistor 140. A diode 142 has its anode connected to output terminal 138, and its cathode connected to the collector of transistor 126.

The operation of the circuit of FIG. 5 will now be described; reference should be made to the waveforms shown in FIG. 6. As mentioned supra, the voltage comparison gate (FIG. 2:40) comprises an electronic switch described and claimed in the aforementioned patent application, to Harvey Rosenberg, a pulse amplifier and an output gating circuit. The driver circuit of FIG. 5 therefore is functionally divided into two sections, one to sample the aforesaid electronic switches and the other to sample the aforesaid output gating circuit; the driver signal outputs are therefore appropriately identified as the sample switch signal developed between terminal 104 and ground, and the strobe signal developed between terminal 138 and ground, respectively.

First it will be helpful to observe conditions during standby conditions, and then to study the dynamic effects produced upon receipt of an input signal from the fine timing reference circuit.

*Quiescent conditions*

The quiescent conditions of the respective transistors are as follows:

| | |
|---|---|
| Transistor **62** | OFF |
| Transistor **66** | ON |
| Transistor **68** | ON |
| Transistor **86** | OFF |
| Transistor **112** | ON |
| Transistor **120** | OFF |
| Transistor **126** | OFF |
| Transistor **128** | ON |

The transistor 62 of multivibrator 64 is cut off—its base is at some positive potential and its collector is at −18 volts. The transistor 66 is conducting so that its base and collector are substantially at ground. The capacitor 70 is thus charged to −18 volts. The paths of conduction through transistor 66 may be traced as follows: (a) ground through the emitter base junction, through resistor 74 to the −18 v. supply, (b) ground through the emitter collector, through resistor 76 to −18 v. supply, and (c) ground, emitter collector of transistor 66, through the collector circuit of transistor 68, to the −6 v. supply.

The transistor 68 is arranged as an emitter follower; the purpose of this transistor is to insert current gain in the regenerative loop 80 of the multivibrator 64 and to provide a low impedance driver for the coupling elements, capacitor resistor 82, 84 and voltage divider 108, 110.

The emitter of transistor 68 is at ground potential. By the voltage dividing action of resistors 108 and 110, the D.C. level of the emitter of transistor 112 is raised to approximately .5 volts. The capacitor 124 is charged to approximately +.5 volt; the charge path may be traced +6 v. supply through resistor 114 through diode 118 through capacitor 124 to ground.

The transistor 120 is thus cut off because its base is +.5 v. with respect to its emitter. The collector of transistor 120 is at −6 v. because of the clamping action of diode 134.

The base of transistor 126 is approximately at −7 v. so that the transistor is cut off. The transistor 128 is conducting and because of the pull-up action of resistor 136 the base thereof is approximately +6 volts. With the transistor 128 conducting, the emitter is clamped at +6 volts; however the current through resistor 140 is of sufficient magnitude so that the voltage dropped across resistor 140 brings terminal 138 substantially to ground. In this condition it will be noted that diode 142 is cut off.

In the standby condition the potential at the base of transistor 86 is −18 v. so the transistor is non-conducting. The collector of transistor 86 is at ground, and thus terminal 104 is at ground.

*Dynamic conditions*

An input from the fine timing reference circuits (FIG. 2: unnumbered) is applied between input terminal 52 and ground. In one practical embodiment the input pulse is of negative polarity with an amplitude of 6 v. and a time width in the order of 0.5 to 2.5 microseconds. The differentiating circuit 56 then differentiates the input signal and the resulting output pulse is applied to the delay multivibrator 64 and more specifically to the base of transistor 62.

The purpose of the delay multivibrator 64 is to standardize the input trigger pulses received from the fine timing reference circuit. As will be shown presently, the multivibrator 64 and the emitter follower 68 cooperate so that the base of transistor 62 will receive a negative signal for a prescribed period of time regardless of the duration of the triggering pulse received from the fine timing reference circuit.

The application of the differentiated negative pulse to transistor 62 causes it to conduct, and the amplified positive going pulse developed at the collector is (a) applied to the base of transistor 66 through coupling capacitor 70 and (b) is also applied to the base of transistor 86.

First we shall consider the events leading to the development of the sample switch pulse between terminal 104 and ground. The conduction of transistor 86 results in the appearance of a negative going pulse at the collector of transistor 86 which pulse becomes the sample switch pulse shown in FIG. 5. There is approximately a .2 microsecond delay in the conduction of transistor 86 because of the transient response of this transistor. The transistor 86 continues to conduct at the trailing edge of the multivibrator 64 pulse until the capacitor 70 changes to ≐−6 volts through the emitter base path of transistor 86, at which time the base and emitter of transistor 86 are at the same potential. The resistor 100 and the diode 102 provide a damping effect to optimize the recovery time between sample switch pulses.

For reasons which will be explained shortly, it is necessary that the sample switch pulse terminate after the strobe pulse. This delay is accomplished in part by introducing sufficient stored charge in the base region to cause a delay of a few tenths of a microsecond in the turn off time of transistor 86. Additional delay is obtained because of the charging action of capacitor 70 toward the Thevenin equivalent of resistor 72 to the −18 v. source, and through the base resistor 94 and the forward biased base emitter junction of transistor 86. This delay is in the order of 0.15 microsecond. The total delay before the sample switch output begins to return to the steady state is therefore approximately 0.45 to 0.55 microsecond.

The series combination of diode 90 and resistor 92 in parallel with resistor 94 provides a low resistance to the base of transistor 86 when the transistor 62 turns on because resistor 94>>resistor 92. During the time that capacitor 70 charges toward ≐6 volts, the diode 90 is cut off and the high ohmic value of resistor 94 provides the needed delay. In some applications it has been found that the diode resistor combination 90, 92 is unnecessary, there being sufficient delay inherent in the remaining structure.

The fuse 106 is added in the output circuit of transistor 86 to protect the pulse transformer (which is not shown in the drawing but which is connected between terminal 104 and ground) in the event of a collector to emitter short.

Next we shall consider the development of the strobe pulses. The positive going pulse developed at the collector of transistor 62 is applied to the base of transistor 66 turning it OFF. The collector of transistor 66 heads toward −18 v. but is stopped short of this potential level by the clamping action of the emitter follower 68. The emitter of transistor 68 goes from ground toward −6 v. and diode 78 is cut off. As may be seen in FIG. 5, the resistor 84 is connected at one end (node) with the emitter of transistor 68. Since this node was previously at ground it now heads toward a negative potential in the order of −16 v.; this transient effect appears as a negative going input signal to the base of transistor 62 so that it remains ON even if the input pulse from the fine timing reference circuit has terminated. The +6 v. source supplies current to the regenerative loop in a circuit which may be traced: +6 v. source, resistor 58, resistor 84 and the transistor 68 to ground. The same +6 v. source also sends current in the direction: +6 v. source, resistor 58, the base collector junction of transistor 62, resistor 72 to ground.

The base of transistor 112 now heads toward a negative voltage in the order of −5 v. because of the voltage dividing action of resistors 108, 110 and in cooperation with the emitter follower 68. The emitter of transistor 112 follows its base and the anode of diode 118 becomes negative in the same order of magnitude (−5 v.). The diode 118 cuts off as soon as its cathode becomes more positive than its anode, and the capacitor 124 discharges through the resistor 122 toward the −18 v. supply.

As soon as the base of transistor 120 reaches ground, it conducts, the collector thereof heading toward ground. This positive going pulse signal is applied to the base of transistor 126 turning it ON. The collector of transistor 126 now goes from +6 v. to −6 v., and the diode 142 is now in a state of conduction. The transistor 128 is turned OFF because of the negative going pulse which is applied to its base.

The diode 142 now provides a low impedance charge path to −6 v. for the output circuit distributed capacity. This rapidly disconnects the isolation diode—allowing the individual voltage comparators to control their respective channel card outputs.

Figure 7:
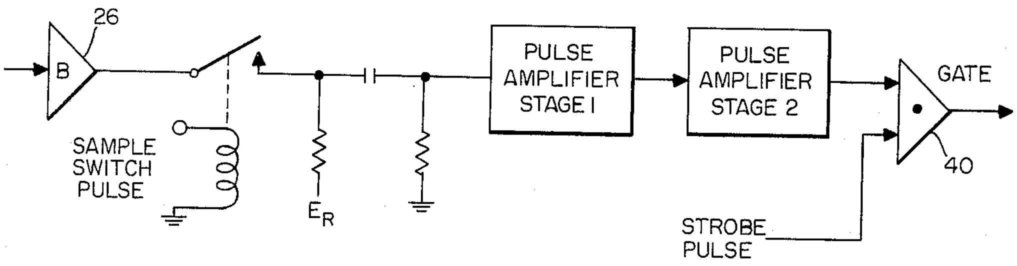
FIG. 7 is a block-schematic used to explain the utilization of the sample switch and strobe pulse signals derived from the FIG. 5 sampling circuit.

Finally in order to appreciate fully the utilization of the sample switch and strobe pulse signals, reference will now be had to the block-schematic diagram of FIG. 7.

The output of the buffer amplifier is applied to a series-pair switch, the purpose of the latter being the detection of very small voltages with reference to ground. In FIG. 7, the contact and solenoid represent functionally the solid state "series pair" switch. The voltage appearing at the output of the "B" amplifier is compared with a reference voltage $E_R$. When the sample switch signal is applied, this places a short across the series-pair switch The capacitor resistor circuit then provides either a positive or a negative pulse output which is applied to the pulse amplifiers; which amplifier comprises two stages. The object of course is to determine the positive going pulse signal.

The pulse amplifier comprises two stages. The first stage functions as a non-linear amplifier; it is provided with a diode on the feedback loop to provide large amplification upon receipt of a positive input and low amplification upon receipt of a negative input. The stages are transformer coupled so that there are positive and negative overshoots. A negative signal, for example, would therefore have a positive overshoot, and if sampling were realized at this moment a spurious result would be obtained. Obviously then it is necessary to insure that only the first occurring positive peak be identified. Accordingly, a stobe pulse of a finite width is applied to the gate 40 so that the gate will have an output only upon the application of the first occurring positive pulse applied to its input. As will be observed from a study of the waveform shown in FIG. 5, the strobe pulse has a time width which is wholly contained within the time width of the sample switch pulse signal.

Obviously many modifications and variations of the present invention are possible in the light of the above teachings. It is therefore to be understood that within the scope of the appended claims the invention may be practiced other than as specifically described and illustrated.

I claim:

1. A sampling circuit of the type described comprising,
(a) multivibrator means having an input terminal connected to receive an input triggering signal and to deliver an output signal and the complement signal therof,
(b) a first transistor driver means for receiving said complement signal and for delivering a sample switch pulse signal, said first driver means connected to provide a trailing edge delayed beyond that of said multivibrator means,
(c) delay means for receiving said output signal and for delivering a delayed leading edge output signal,
(d) a second transistor driver means connected to receive said delayed leading edge output signal and for delivering a strobe output pulse signal having a time width wholly contained within the time width of said sample switch pulse.

2. A sampling circuit according to claim 1, in which,
(e) said multivibrator means comprises first and second transistors with a regenerative feedback loop coupling the output of said second transistor to the input to said first transistor, and
(f) an emitter follower having a low impedance drive connected to said loop for supplying loop power gain thereto.

3. A samping circuit according to claim 1 in which,
(e) said first transistor driver means comprises a transistor resistively coupled to receive said complement signal, the time width of said sample switch pulse signal being a function of the stored charge induced in said transistor and the trailing edge of said pulse signal being further delayed by an emitter base charge path of said transistor connected to a timing capacitor in said multivibrator means.

4. A sampling circuit according to claim 1 in which,
(e) said delay means comprises a resistor and a capacitor in series, and
(f) switching means connected to the common node of said resistor-capacitor combination adapted to permit charging said capacitor during standby and to permit discharging thereof upon receipt of the leading edge of said output signal.

5. A sampling circuit according to claim 1 in which,
(e) said second transistor driver means comprises first and second transistors, the output of the first being connected to the output of the second by unidirectional conductive means whereby the forward and back-biased conditions of said unidirectional conductive means respectively determines the output width of said strobe signal pulse.

6. A sampling circuit according to claim 1 in which,
(e) said multivibrator means comprises first and second transistors arranged in the common emitter configuration with a regenerative feedback loop coupling the collector of said second transistor to the base of said first transistor, and
(f) an emitter follower having a low impedance drive connected in said regenerative loop for supplying loop power gain thereto.

7. A sampling circuit according to claim 1 in which,
(e) said first transistor driver means comprises a transistor arranged in the common emitter configuration and having its base resistively coupled to said multivibrator means to receive said complement signal, the time width of said sample switch pulse signal being a function of the stored charge induced in said transistor and the trailing edge of said pulse being further delayed by an emitter base charge path of said transistor connected to a timing capacitor in said multivibrator means.

8. A sampling circuit according to claim 1 in which,
(e) said delay means comprises a resistor and a capacitor connected in series and adapted to receive a source of potential, and
(f) unidirectional conductive means connected to the common node of said resistor-capacitor combination and adapted to permit a charging of said capacitor during standby and discharging thereof upon receipt of the leading edge of said output signal.

9. A sampling circuit according to claim 1 in which,
(e) said second transistor driver means comprises first and second transistors arranged in cascade, the output of the first being connected to the output of the second by unidirectional conductive means whereby the forward and back-bias conditions of said unidirectional conductive means respectively determines the output width of said strobe signal pulse.

10. A sampling circuit of the type described comprising,
(a) differentiating means for receiving an input triggering signal and for delivering a differentiated output signal,
(b) multivibrator means connected to receive said differentiated signal and to deliver an output signal and the complement signal thereof,
(c) a first transistor driver means for receiving said complement signal and for delivering a sample switch pulse signal, said first driver means connected to be driven into saturation thereby providing a delayed turn off,
(d) delay means for receiving said output signal and for delivering a delayed leading edge output signal,
(e) a second transistor driver means connected to receive said delayed leading edge output signal and for delivering a strobe output pulse signal having a time width wholly contained within the time width of said sample switch pulse signal.

11. A sampling circuit of the type described comprising,
(a) differentiating means for receiving an input triggering signal and for delivering a differentiating output signal,
(b) multivibrator means connected to receive an input signal and to deliver an output signal and the complement signal thereof,
(c) a first transistor driver means for receiving said complement signal and for delivering a sample switch pulse signal, said first transistor driver means connected to provide a trailing edge delayed beyond that of said multivibrator means,
(d) resistor-capacitor means for receiving said output signal and for delivering a delayed leading edge output signal,
(e) amplifying means for receiving said delayed leading edge output signal as a triggering input and for delivering an amplified output signal,
(f) a second transistor driver means connected to receive said amplified output signal and for delivering a strobe output pulse signal having a time width wholly contained within a time width of said sample switch pulse.

12. A sampling circuit of the type described comprising,
(a) differentiating means for receiving an input triggering signal and for delivering a differentiating output signal,
(b) multivibrator means connected to receive said differentiated signal and to deliver an output signal and the complement signal thereof, said multivibrator means comprising first and second amplifying means, the output of the first amplifier being capacitively coupled to the input of the second amplifier, (c) a feedback path regeneratively coupling the output of the second amplifier with the input of the first amplifier, (d) a first transistor driver means for receiving said complement signal and for delivering a sample switch pulse signal, said first driver means connected to be driven into saturation thereby providing a delayed turn off, (e) delay means for receiving said output signal and for delivering a delayed leading edge output signal, (f) a second transistor driver means connected to receive said delayed leading edge output signal and for delivering a strobe output pulse signal having a time width wholly contained within the time width of said sample switch pulse.

13. A sampling circuit according to claim 12 in which, (g) said first and second amplifying devices are transistors, (h) said regenerative feedback loop comprises a third transistor arranged in the emitter follower configuration with its base connected to the output of said second transistor, and (i) a unidirectional conductive device connected between the output of said second transistor and the emitter of said third transistor.

14. A sampling cicuit according to claim 12 in which, (g) said first and said second amplifying devices are transistors, and (h) said regenerative feedback loop comprises a third transistor arranged in the emitter follower configuration with its base electrode connected to the output of the second transistor, and (i) a unidirectional conductive device connected between the output of the second transistor and the emitter of said third transistor, and (j) a resistor and a capacitor connected in parallel, the parallel combination being connected between the emitter of said first transistor and the input to said first transistor.

References Cited by the Examiner

UNITED STATES PATENTS

| | | | |
|---|---|---|---|
| 2,402,916 | 6/1946 | Schroeder | 328—63 |
| 2,721,937 | 10/1955 | Braga | 328—200 |
| 2,909,678 | 10/1959 | Jensen | 307—88.5 |
| 2,924,812 | 2/1960 | Merritt | 340—149.1 |
| 2,987,632 | 6/1961 | Milford | 307—88.5 |
| 3,035,184 | 5/1962 | Walker et al. | 307—88.5 |
| 3,037,132 | 5/1962 | Skerritt | 307—88.5 |
| 3,073,968 | 1/1963 | Tribby | 307—88.5 |
| 3,093,750 | 6/1963 | Brauer | 307—88.5 |

ARTHUR GAUSS, *Primary Examiner.*

IRVING L. SRAGOW, JOHN W. HUCKERT, *Examiners.*